(12) United States Patent
Li

(10) Patent No.: US 11,598,147 B2
(45) Date of Patent: Mar. 7, 2023

(54) ROLLER BLIND SHAFT

(71) Applicant: Jeff Wh Li, Irvine, CA (US)

(72) Inventor: Jeff Wh Li, Irvine, CA (US)

( * ) Notice: Subject to any disclaimer, the term of this patent is extended or adjusted under 35 U.S.C. 154(b) by 25 days.

(21) Appl. No.: 17/199,612

(22) Filed: Mar. 12, 2021

(65) Prior Publication Data
US 2022/0290495 A1  Sep. 15, 2022

(51) Int. Cl.
*E06B 9/42* (2006.01)

(52) U.S. Cl.
CPC ..................... *E06B 9/42* (2013.01)

(58) Field of Classification Search
CPC ............... E06B 9/42; E06B 2009/247; E06B 2009/2476; E06B 9/40; E06B 9/68; E06B 9/70; E06B 9/323
USPC ........................................................... 160/127
See application file for complete search history.

(56) References Cited

U.S. PATENT DOCUMENTS

| | | | | |
|---|---|---|---|---|
| 1,232,729 A * | 7/1917 | Stam | ................... | E06B 9/50 160/297 |
| 3,340,922 A * | 9/1967 | Anderson | .............. | E06B 9/44 160/326 |
| 9,410,367 B2 * | 8/2016 | Coker | .................... | E06B 9/323 |
| 9,957,752 B2 * | 5/2018 | Bohlen | ..................... | E06B 9/50 |
| 2009/0088904 A1 * | 4/2009 | Brioschi | ................ | E06B 9/68 160/127 |
| 2018/0291682 A1 * | 10/2018 | Walter-Seifart | ......... | E06B 9/40 |
| 2018/0355664 A1 * | 12/2018 | Schorling | ............... | E06B 9/40 |
| 2019/0323285 A1 * | 10/2019 | Wong | ....................... | E06B 9/72 |
| 2020/0217130 A1 * | 7/2020 | Lai | ............................ | E06B 9/50 |
| 2021/0363822 A1 * | 11/2021 | Blair | ........................ | E06B 9/42 |

FOREIGN PATENT DOCUMENTS

CN   205558755 U  *  9/2016  ............... E06B 9/68

* cited by examiner

*Primary Examiner* — Beth A Stephan
(74) *Attorney, Agent, or Firm* — Li & Cai Intellectual Property (USA) Office

(57) ABSTRACT

A novel roller blind shaft is provided, comprising a roller blind having a reel, a lower curtain rod, a curtain fabric arranged between the reel and the lower curtain rod, and a driving device for driving the reel to rotate. A bearing seat is correspondingly provided at both ends of the reel. The novel roller blind shaft comprises: moving devices, which are respectively a first moving device and a second moving device arranged parallel to each other, arranged on the bearing seats at both ends of the reel and perpendicular to the reel and configured to drive the reel to move back and forth to adjust a gap between the curtain fabric and the wall, and a control device electrically connected to the first and second moving devices and configured to synchronously control the first and second moving devices to synchronously drive the reel to move back and forth.

7 Claims, 3 Drawing Sheets

ROLLER BLIND SHAFT

FIELD OF THE DISCLOSURE

The present disclosure relates to the technical field of a roller blind shaft, in particular, to a novel roller blind shaft.

BACKGROUND OF THE DISCLOSURE

In life, people use curtains to block sunlight and sight. The existing curtains are like roller blinds. Generally, it includes a reel, a lower curtain rod, a curtain arranged between the reel and the lower curtain rod, and a driving device that drives the reel to rotate. When the curtain is lowered, the gap between the curtain fabric and the wall is large so that the shading effect is not good due to the large gap between the reel of the reel mechanism and the wall. Therefore, it is necessary to design a novel roller blind shaft that can reduce the gap between the curtain fabric and the wall when the curtain fabric falls.

SUMMARY OF THE DISCLOSURE

The purpose of the present disclosure is to provide a novel roller blind shaft in view of the defects and deficiencies of the prior art, and the user can control the moving devices to move back and forth through the control device to adjust the gap between the curtain fabric and the wall to increase the shading effect when the curtain fabric falls. At the same time, the effect of winding and falling of the curtain fabric will not be hindered.

In order to achieve the above objective, the technical solution adopted by the present disclosure is: a novel roller blind shaft comprising a roller blind, wherein the roller blind comprises: a reel, a lower curtain rod, a curtain fabric arranged between the reel and the lower curtain rod, and a driving device for driving the reel to rotate, wherein a bearing seat is correspondingly provided at both ends of the reel, and wherein the novel roller blind shaft further comprises: moving devices, which are respectively a first moving device and a second moving device arranged parallel to each other, respectively arranged on the bearing seats at the both ends of the reel and perpendicular to the reel and configured to drive the reel to move back and forth to adjust a gap between the curtain fabric and the wall, and a control device electrically connected to the first moving device and the second moving device respectively and configured to synchronously control the first moving device and the second moving device to synchronously drive the reel to move back and forth.

In a preferred embodiment, a fixed seat, which is configured to facilitate the user to fix the first moving device and the second moving device on the wall, is provided on the first moving device and the second moving device.

In a preferred embodiment, the control device comprises: a housing, a controller provided in the housing and electrically connected to the first moving device and the second moving device, and a power supply provided in the housing and electrically connected to the controller.

In a preferred embodiment, the first moving device and the second moving device are both a linear module of a synchronous belt.

In a preferred embodiment, the first moving device and the second moving device are both a screw-type linear module.

In a preferred embodiment, an illuminating lamp, which is electrically connected to the control device, is provided at one end of the first moving device and one end of the second moving device away from the fixed seat.

In a preferred embodiment, the control device further comprises: a solar charging board arranged outside the housing and electrically connected to the controller, and configured to charge the power supply.

After adopting the above technical solution, the beneficial effects of the present disclosure are as follows. A novel roller blind shaft comprises a roller blind, wherein the roller blind comprises: a reel, a lower curtain rod, a curtain fabric arranged between the reel and the lower curtain rod, and a driving device for driving the reel to rotate. The novel roller blind shaft further comprises: moving devices and a control device. The moving devices are respectively arranged on the bearing seats at the both ends of the reel and perpendicular to the reel, and are configured to drive the reel to move back and forth to adjust a gap between the curtain fabric and the wall, in which the moving devices which are arranged at the both ends of the reel are respectively a first moving device and a second moving device. The control device is electrically connected to the first moving device and the second moving device respectively and configured to synchronously control the first moving device and the second moving device to synchronously drive the reel to move back and forth. The user can control the moving devices to move back and forth through the control device to adjust the gap between the curtain fabric and the wall to increase the shading effect when the curtain fabric falls. At the same time, the effect of winding and falling of the curtain fabric will not be hindered.

BRIEF DESCRIPTION OF THE DRAWINGS

In order to explain the embodiments of the present disclosure or the technical solutions in the prior art more clearly, the following will briefly introduce the drawings that need to be used in the description of the embodiments or the prior art. Obviously, the drawings in the following description are only some embodiments of the present disclosure. For those of ordinary skill in the art, other drawings can be obtained based on these drawings without creative labor.

Figure 1:
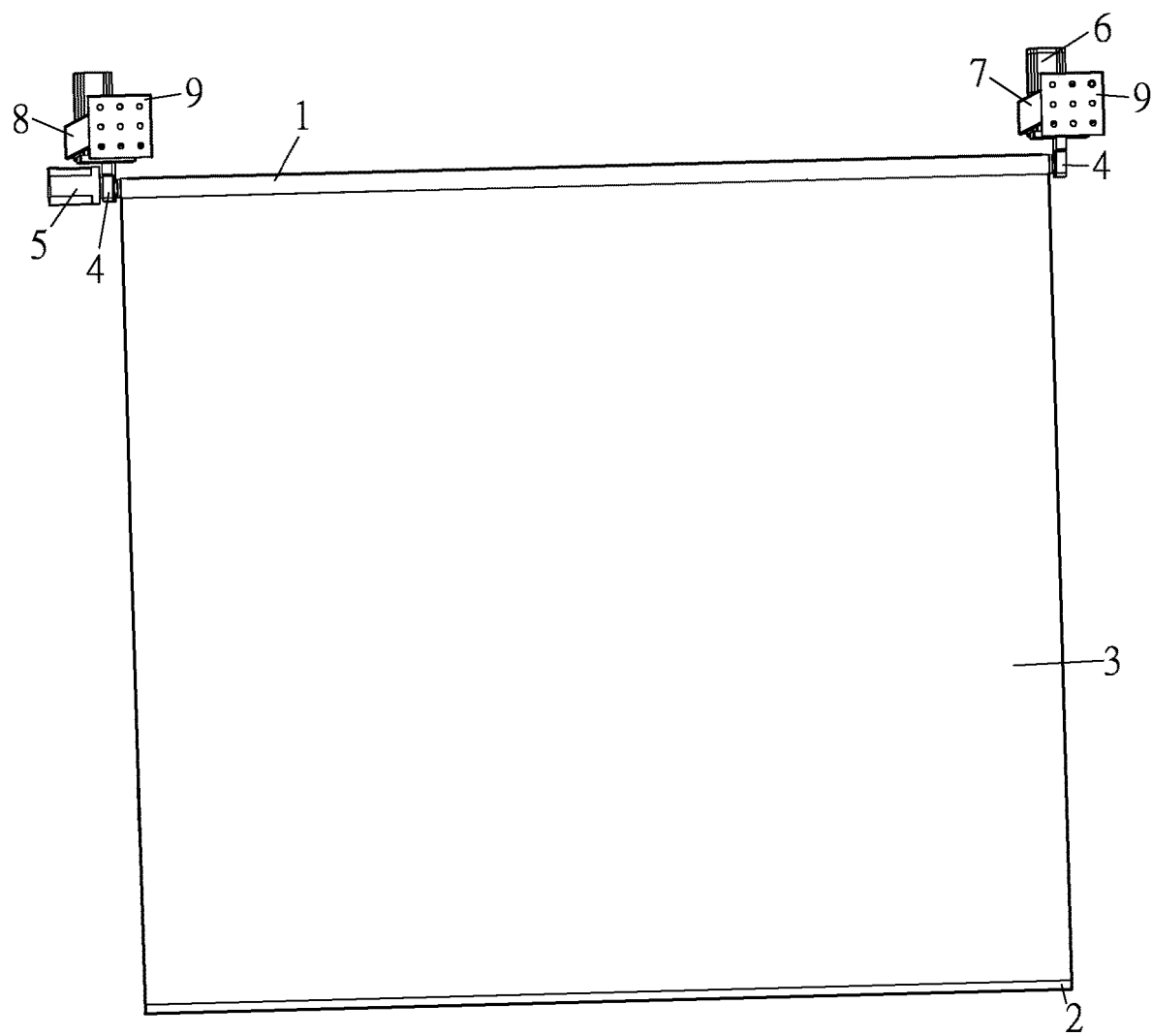
FIG. 1 is a schematic diagram of the structure of the present disclosure.

Reference numeral: 1. reel; 2. lower curtain rod; 3. curtain fabric; 4. bearing seat; 5. driving device; 6. moving device; 7. first moving device; 8. second moving device; 9. fixed seat; 61. housing; 62. sliding rail; 63. synchronous wheel; 64. sliding table; 65. synchronous belt; 66. servo motor.

DETAILED DESCRIPTION OF THE EXEMPLARY EMBODIMENTS

The present disclosure will be further described in detail below in conjunction with the drawings.

This specific embodiment is only an explanation of the present disclosure, and it is not a limitation of the present disclosure. After reading this specification, those skilled in the art can make modifications that do not contribute to this embodiment as needed, but as long as they are within the scope of the claims of the present disclosure, they are protected by the patent law.

Figure 2:
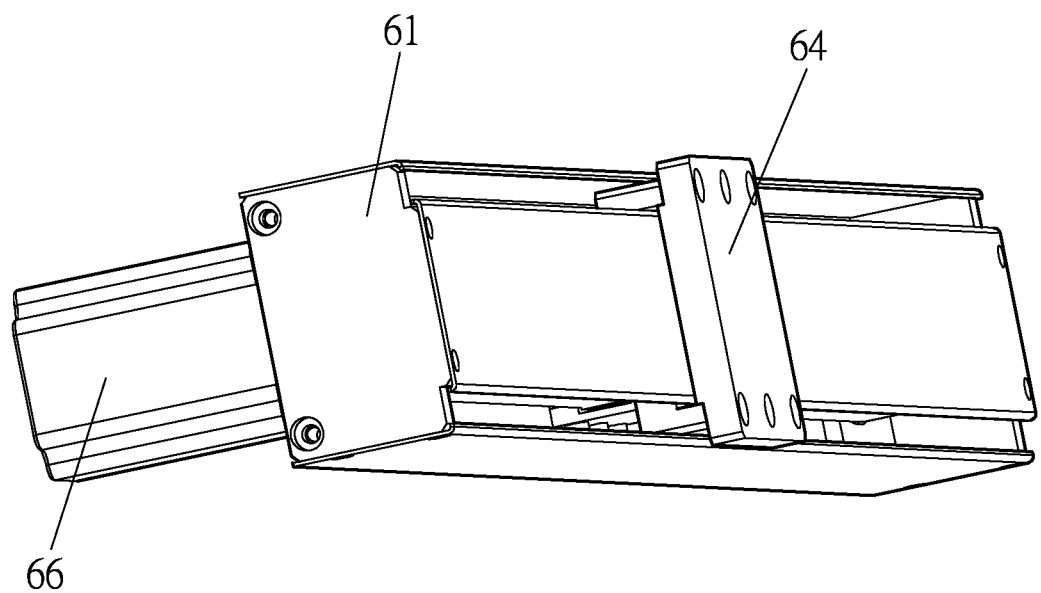
FIG. 2 is a schematic diagram of the structure of the moving devices of the present disclosure.
Figure 3:
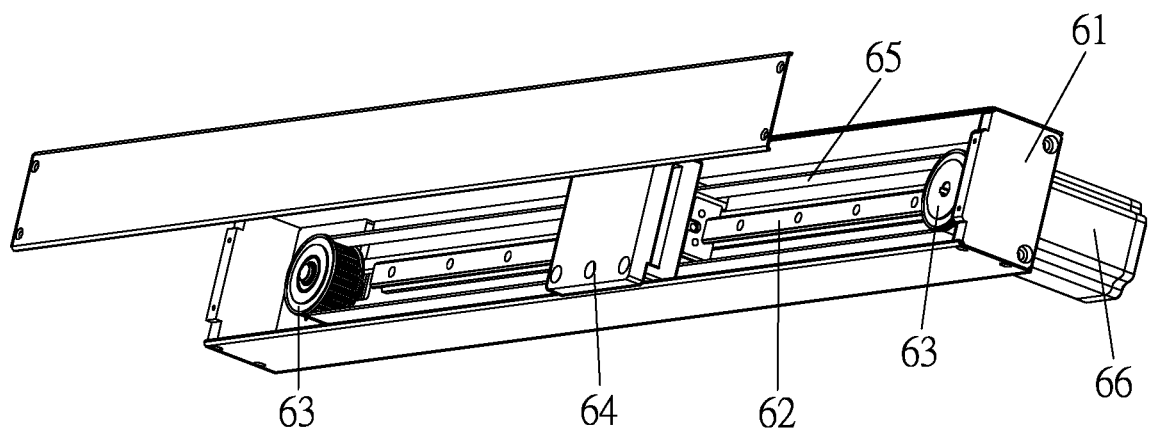
FIG. 3 is an exploded schematic diagram of the moving devices of the present disclosure.

As shown in FIG. 1 to FIG. 3, the present disclosure relates to a novel roller blind shaft comprising a roller blind, wherein the roller blind comprises: a reel 1, a lower curtain rod 2, a curtain fabric 3 arranged between the reel 1 and the lower curtain rod 2, and a driving device 5 for driving the reel 1 to rotate, and wherein a bearing seat 4 is correspondingly provided at both ends of the reel 1. Specifically, the novel roller blind shaft further comprises: moving devices 6 and a control device.

The moving devices 6 are respectively arranged on the bearing seats 4 at the both ends of the reel 1 and perpendicular to the reel 1 and configured to drive the reel 1 to move back and forth to adjust a gap between the curtain fabric 3 and the wall. The moving devices 6 are respectively a first moving device 7 and a second moving device 8. The control device is electrically connected to the first moving device 7 and the second moving device 8 respectively and configured to synchronously control the first moving device 7 and the second moving device 8 to synchronously drive the reel 1 to move back and forth. In the present embodiment, the installation location of the control device can be selected according to the needs of the user. The control device can be installed above one of the moving devices 6, or on the wall. The user can control the moving devices 6 to move back and forth through the control device to adjust the gap between the curtain fabric 3 and the wall to increase the shading effect when the curtain fabric 3 falls. At the same time, the effect of winding and falling of the curtain fabric 3 will not be hindered.

It should be noted that the roller blind is an electric roller blind in the prior art, and the driving device 5 is a motor. A bearing seat 4 is provided at both ends of the reel 1, and the two moving devices 6 can be fixed on the bearing seats 4 at the both ends of the reel 1. The two moving devices 6 are respectively arranged on the bearing seats 4 at the both ends of the reel 1, and one end of one of the bearing seats 4 is fixed to the driving device 5. In other embodiments, the roller blind is a manual roller blind in the prior art, and the driving device 5 is an existing rope or rod. The moving devices 6 are used for manual roller blinds and electric roller blinds, and have a wide range of use.

Preferably, both the first moving device 7 and the second moving device 8 are provided with a fixed seat 9 for the user to fix the first moving device 7 and the second moving device 8 on the wall. The two fixed bases 9 are respectively integrally formed with one end of the two moving devices 6, or welded or fixed together by screws. The fixed member is provided with fixed holes for the user to fix the moving devices 6 on the wall. In some embodiments, nano double-sided tape is also provided on the fixed bases 9. The fixed bases 9 can be a fixed tripod or a fixed piece in the prior art.

Preferably, the control device comprises: a housing, a controller, and a power supply.

The controller is provided in the housing and electrically connected to the first moving device 7 and the second moving device 8, and the power supply is provided in the housing and electrically connected to the controller. The controller is the control center that controls the movement of the moving devices 6. In the present embodiment, the control device is also provided with a wireless receiving module connected to the controller. The wireless receiving module is used to receive the control signal transmitted by an external wireless transmitting module. The signal received by the wireless receiving module controls the moving devices 6 to move back and forth, which is convenient for the user to perform remote control through a remote control or a smart phone. The power supply is a rechargeable power supply or a cable plugged into an external power supply socket. The power supply is used to supply power to the first moving device 7, the second moving device 8, and the controller. In some embodiments, the housing is provided with a number of switches that are electrically connected to the controller and the user controls the operation of the moving devices 6, and the control device is installed on the wall at this time. The control device is a control box in the prior art and will not be described redundantly in the figures. In some embodiments, the control device further includes: a solar charging board arranged outside the housing and electrically connected to the controller, and configured to charge the power supply. The power supply is a battery. The solar charging board can be placed on the window where the sun is irradiated or installed outside the window where the sun is irradiated to charge the power supply in the control device, so as to embody the power supply for the control device, the first moving device 7 and the second moving device 8, and has the effect of saving household electricity and environmental protection. The solar charging board is an existing technology and is not shown in the figures.

Preferably, the first moving device 7 and the second moving device 8 are both a linear module of a synchronous belt 65 in the prior art. In other embodiments, the first moving device 7 and the second moving device 8 are both a screw-type linear module in the prior art. The linear module of the synchronous belt 65 comprises a shell 61, a sliding rail 62, a synchronous wheel 63, a sliding table 64, a synchronous belt 65, and a servo motor 66. The servo motor 66 is electrically connected to the control device, and the sliding rail 62 is arranged in the shell 61. Two synchronous wheels 63 are provided, and the two synchronous wheels 63 are respectively arranged at both ends of the slide rail 62. The motor output shaft and one of the synchronous wheels 63 are drivingly connected with the slide rail 62, and the slide rail 62 is provided with two synchronous wheels 63. The synchronous belt 65 surrounds the two synchronous wheels 63, a part of sliding table 64 is slidably assembled on sliding rail 62, and a part is fixed on the synchronous belt 65 on the side between the two synchronous wheels 63, so that under the driving of the synchronous belt 65, the sliding table 64 moves along the sliding rail 62, and a part of the sliding table 64 is located outside the housing 61 and can move along the shell 61.

Preferably, an illuminating lamp, which is electrically connected to the control device, is provided at one end of the first moving device 7 and one end of the second moving device 8 away from the fixed seat 9. The control device can also control the light of the illuminating lamp to turn on or turn off. The illuminating lamp is used to illuminate the pattern on the curtain fabric 3 or illuminate the user in a dark environment, thereby increasing the atmosphere. The illuminating lamp is an LED lamp in the prior art, which is not shown in the figures.

The working principle of the present disclosure is roughly as follows. The novel roller blind shaft comprises a roller blind, and the roller blind comprises: a reel 1, a lower curtain rod 2, a curtain fabric 3 arranged between the reel 1 and the lower curtain rod 2, and a driving device 5 for driving the reel 1 to rotate. The novel roller blind shaft further comprises: moving devices 6 and a control device. The moving devices 6 are respectively arranged on the bearing seats 4 at the both ends of the reel 1 and perpendicular to the reel 1 and configured to drive the reel 1 to move back and forth to adjust a gap between the curtain fabric 3 and the wall. The moving devices 6 are respectively a first moving device 7 and a second moving device 8. The control device is electrically connected to the first moving device 7 and the second moving device 8 respectively and configured to synchronously control the first moving device 7 and the second moving device 8 to synchronously drive the reel 1 to move back and forth. The user can control the moving devices 6 to move back and forth through the control device to adjust the gap between the curtain fabric 3 and the wall to increase the shading effect when the curtain fabric 3 falls. At the same time, the effect of winding and falling of the curtain fabric 3 will not be hindered.

The above are only used to illustrate the technical solutions of the present disclosure and not to limit them. Other modifications or equivalent replacements made by those of ordinary skill in the art to the technical solution of the present disclosure shall be covered by the scope of the claims of the present disclosure as long as they do not depart from the spirit and scope of the technical solution of the present disclosure.

What is claimed is:

1. A novel roller blind shaft, comprising a roller blind, wherein the roller blind comprises:
    a reel (1);
    a lower curtain rod (2);
    a curtain fabric (3) arranged between the reel (1) and the lower curtain rod (2);
    a driving device (5) configured to electrically drive the reel (1) to rotate; and
    moving devices (6) arranged perpendicular to the reel (1) and configured to electrically drive the curtain fabric (3) to move back and forth through the reel (1) to adjust a gap between the curtain fabric (3) and a wall.

2. The novel roller blind shaft according to claim 1, wherein a fixed seat (9), which is configured to facilitate the user to fix the moving devices (6) on the wall, is provided on each of the moving devices (6).

3. The novel roller blind shaft according to claim 2, wherein the novel roller blind shaft further comprises a control device, the control device comprising:
    a housing;
    a controller provided in the housing and electrically connected to each of the moving devices (6); and
    a power supply provided in the housing and electrically connected to the controller.

4. The novel roller blind shaft according to claim 3, wherein each of the moving devices (6) is a linear module of a synchronous belt (65).

5. The novel roller blind shaft according to claim 3, wherein each of the moving devices (6) is a screw-type linear module.

6. The novel roller blind shaft according to claim 2, wherein an illuminating lamp, which is electrically connected to a control device, is provided at one end of each of the moving devices (6) away from the fixed seat (9).

7. The novel roller blind shaft according to claim 3, wherein the control device further comprises: a solar charging board arranged outside the housing and electrically connected to the controller, and configured to charge the power supply.

\* \* \* \* \*